(12) United States Patent
Thomas

(10) Patent No.: US 7,448,478 B2
(45) Date of Patent: Nov. 11, 2008

(54) UPPER STRUT MOUNT

(76) Inventor: Sean Thomas, 2041 Western Village La., Houston, TX (US) 77043

( * ) Notice: Subject to any disclaimer, the term of this patent is extended or adjusted under 35 U.S.C. 154(b) by 205 days.

(21) Appl. No.: 10/978,763

(22) Filed: Nov. 1, 2004

(65) Prior Publication Data
US 2005/0115785 A1    Jun. 2, 2005

Related U.S. Application Data

(60) Provisional application No. 60/516,180, filed on Oct. 31, 2003.

(51) Int. Cl.
F16F 9/00 (2006.01)
(52) U.S. Cl. .................. 188/321.11; 267/140.3
(58) Field of Classification Search ............ 188/321.11; 264/140.12, 141.3, 141.4; 280/124.147, 280/86.756, 86.752; D12/120
See application file for complete search history.

(56) References Cited

U.S. PATENT DOCUMENTS

| | | | |
|---|---|---|---|
| 3,037,787 A * | 6/1962 | Gottschald | 280/124.147 |
| 4,332,397 A * | 6/1982 | Steger | 280/124.155 |
| 4,372,575 A | 2/1983 | Hyman | |
| 4,377,298 A | 3/1983 | Finn et al. | |
| 4,711,463 A | 12/1987 | Knable et al. | |
| 4,721,325 A | 1/1988 | Mackovjak et al. | |
| 4,779,855 A * | 10/1988 | Tanaka | 267/220 |
| 4,817,984 A | 4/1989 | Ferman et al. | |
| 4,863,187 A | 9/1989 | Artz | |
| 4,867,473 A | 9/1989 | Jordan | |
| 4,883,288 A | 11/1989 | Finn et al. | |
| 4,946,188 A | 8/1990 | Key et al. | |
| 4,948,160 A | 8/1990 | Barry | |
| 4,971,348 A * | 11/1990 | Oyama et al. | 280/5.521 |
| 5,454,585 A | 10/1995 | Dronen et al. | |
| 5,467,971 A | 11/1995 | Hurtubise et al. | |
| 5,484,161 A | 1/1996 | McIntyre | |
| D371,334 S | 7/1996 | Hotchkis, Jr. et al. | |
| 5,788,262 A | 8/1998 | Dazy et al. | |
| 5,979,218 A | 11/1999 | Biddle et al. | |
| 6,079,700 A | 6/2000 | Solomond et al. | |
| 6,082,749 A | 7/2000 | Smith et al. | |
| 6,247,688 B1 | 6/2001 | De Fontenay et al. | |
| 6,257,601 B1 | 7/2001 | Spears et al. | |
| 6,273,406 B1 * | 8/2001 | Miyamoto et al. | 267/140.12 |
| 6,328,321 B1 | 12/2001 | Nolan | |
| 6,382,645 B1 | 5/2002 | Gravelle et al. | |
| 6,485,223 B1 | 11/2002 | Van Schmus et al. | |
| 6,676,145 B2 | 1/2004 | Carlstedt et al. | |
| D494,894 S | 8/2004 | Carlson | |
| 6,843,472 B2 * | 1/2005 | Henry et al. | 267/64.24 |
| 6,988,718 B1 * | 1/2006 | Eulenbach et al. | 267/33 |
| 2003/0122343 A1 | 7/2003 | Carlstedt et al. | |
| 2004/0178552 A1 | 9/2004 | Schudt et al. | |

FOREIGN PATENT DOCUMENTS

| | | | |
|---|---|---|---|
| JP | 3-272336 | * | 12/1991 |
| JP | 10-58933 | * | 3/1998 |

* cited by examiner

*Primary Examiner*—Bradley T King
(74) *Attorney, Agent, or Firm*—Fulbright & Jaworski, LLP

(57) ABSTRACT

The present invention relates to an upper strut mount that allows rotation about three axes, accommodates the threaded end of a strut piston rod, is laterally stiff to almost completely eliminate side deflection, while maintaining a reasonable degree of vertical compliance. The strut mount uses a housing element to retain a spherical bearing between elastomeric bushings.

23 Claims, 3 Drawing Sheets

UPPER STRUT MOUNT

This application claims priority to U.S. Application Ser. No. 60/516,180, filed Oct. 31, 2003.

BACKGROUND OF THE INVENTION

One of the more common designs for automotive front suspensions is known as the McPherson strut suspension. As with all suspensions for motor vehicle applications, the components used are selected to provide a compromise between ideal suspension function and ride comfort. For this reason, rubber bushing elements are commonly used at some suspension pivot points, while various types of ball joints are used at others.

McPherson strut suspensions utilize a control arm that is pivotally attached to the chassis, with rotation about one axis, to allow vertical movement of the suspension and tire. A strut assembly, commonly referred to as a strut, and consisting of a shock absorber mounted inside a coil spring, is rigidly attached to a steerable spindle, to which a rotating hub and the vehicle wheel are attached. The spindle can be bolted to the bottom of the strut assembly, or may be integrated with the strut.

McPherson strut suspensions commonly use cylindrical rubber bushings at the two inner pivot points of the suspension control arm, pressed into two respective female bores within the control arm, and retained to the vehicle chassis with a bolt or pin at each location. Suspension arm pivot bushings allow rotation about one axis, while providing compliant attachment of the arm to the chassis to dampen vibrations and shock loads.

A single ball joint is normally used at the outer end of the control arm to pivotally attach the suspension strut to the control arm. The common ball joint design utilizes a ball joint pin, consisting of a metal sphere and cylindrical pin, installed into a plastic spherical female socket, and sealed with a rubber boot and lubricant. A ball joint allows rotation about three axes, with the center of rotation occurring at the center of the sphere of the ball joint pin. Rotation about the ball joint pin centerline is required to accommodate the steering angle, and is not limited by the geometry of the ball joint. Rotation in the other two directions is limited by the mechanics of the ball joint, with a total angular deflection normally between 40 and 60 degrees.

The attachment point connecting the strut assembly to the vehicle chassis is commonly referred to as the upper strut mount, or upper strut bearing. As with the ball joint at the bottom of the strut, the upper strut mount must allow rotation about all 3 axes. A bearing or bushing is normally used to allow rotation about the strut centerline axis. Rotation about the other two axes is much less at the top of the strut than is required at the bottom of the strut, due to the geometric configuration of the McPherson strut design. While the ball joint at the bottom might allow a total angular deflection of 40 degrees or more, the upper strut mount requires a total angular deflection from the relative horizontal plane of less than 20 degrees, and generally less than 10 degrees.

Because the suspension loads from the vehicle wheel are transferred directly through the spindle into the strut assembly, it is necessary to utilize a compliant upper strut mount to minimize the shock loads and vibration that are transferred to the vehicle chassis. Because the upper strut mount must also allow limited rotation about the two relative horizontal axes, a large rubber bushing element, or multiple bushing elements, is commonly used, which allows this rotation and provides both vertical and lateral compliance. While the vertical compliance provides the damping qualities that ensure good ride quality, the lateral compliance allows large amounts of lateral deflection under heavy cornering loads, which directly leads to loss of tire camber angle, loss of tire grip, and loss of cornering performance.

There are many different versions of strut suspension upper strut mounts used in production vehicles. Some designs utilize one integrated, molded rubber bushing that carries both upward and downward vertical loads, in addition to lateral loads. Other designs utilize separate upper and lower bushings to carry the upward vertical, downward vertical, and lateral loads. Still other designs utilize multiple bushings. The common characteristic of these designs is that there is sufficient compliance based on the geometry, thickness, and durometer of the rubber bushings to allow the required rotation about the two relative horizontal axes. Another common feature of upper strut mounts is that the inner housing has a central hole, through which the strut shock absorber piston rod is mounted and secured with a threaded nut.

For racing car applications, the rubber control arm bushings and the upper strut mounts are replaced with spherical bearings and/or plain bearings that have negligible compliance and negligible deflection, even under extremely high loads. Both spherical bearings and plain bearings may be metal-to-metal designs, or they may use thin non-metallic liners to reduce friction and wear and to extend life. Sometimes rigid plastic bushings may be used.

Teflon-lined spherical bearings are commonly used for racing applications to replace the upper strut mount, which provides the required rotation about all 3 axes. One negative aspect of this change is a tremendous increase in the shock loading and vibration that is transferred to the chassis. This level of deterioration in ride quality is normally unacceptable for a street-driven vehicle. However, this change eliminates the lateral deflection that normally occurs at the top of the strut due to the deflection of the upper strut mount, ensuring that optimum tire camber angle is maintained under heavy cornering loads.

Spherical metal bearings and plain metal bearings used in automotive racing applications are not generally designed to carry the impact loads that occur during street driving. Furthermore, metal bearings of all types are subject to wear, damage and noise, and require relatively frequent maintenance and replacement. These types of bearings are often unsealed, and exposure to water and road grit during street driving will further contribute to rapid wear and deterioration.

There is therefore a need for an upper strut mount that combines the beneficial aspects of rubber control arms bushing and spherical bearings. The following sections describe and claim applicant's inventive upper strut mount.

BRIEF SUMMARY OF THE INVENTION

The present invention is directed to an upper strut mount comprising, an enclosing housing, a strut piston rod, a spherical bearing positioned in a fixed relationship with said strut piston rod, a bearing housing adapted to support said spherical bearing and positioned within said enclosing housing, an elastomeric bushing positioned above said bearing housing respectively, and a non-metallic wear ring between bearing housing and said enclosing housing.

The invention may also include an upper and lower spacer that are positioned relative to the spherical bearing to limit the angular deflection of the strut piston rod.

The elastomeric bushings referenced above may be made from rubber, synthetic rubber, polyurethane, or combinations thereof.

The bearing housing referenced above may be configured with a groove that is adapted to support a non-metallic wear ring. In one embodiment, the groove is sized so that the bearing housing does not contact the enclosing housing. In a further embodiment, the non-metallic wear ring is substantially incompressible relative to the elastomeric bushing.

The invention may further include an enclosing flange positioned within the enclosing housing and below the bearing housing. The enclosing flange may be used to pre-load the elastomeric bushing.

The invention may also include a second elastomeric bushing positioned below and concentric to the bearing housing.

The invention may also include an outer housing, wherein the enclosing housing is adjustably positioned within the outer housing. The outer housing may be configured with attachment points for mounting the outer housing to a vehicle.

A further embodiment of the novel upper strut mount includes an enclosing housing with an inside and outside surface; a bearing housing slideably engaged to the inside surface of the enclosing housing; an upper elastomeric bushing disposed between the bearing housing and the enclosing housing; a spherical bearing ball rotationally secured within the bearing housing; and a strut piston rod extending through the spherical bearing ball. The upper elastomeric bushing may be sized such that its width is greater than its height. The upper elastomeric bushing may also be positioned concentric to the strut piston rod.

The upper strut mount may further include a lower elastomeric bushing disposed below the bearing housing and concentric to the strut piston rod.

The upper strut mount may be designed such that the spherical bearing transmits substantially all loads from the strut piston rod to the bearing housing.

The upper strut mount may further include a wear ring disposed about the bearing housing. The bearing housing may include a groove that is configured to receive the wear ring. The upper strut mount may further include a spherical bearing race disposed between the spherical bearing ball and the bearing housing. The upper strut mount may further include an outer housing, wherein the enclosing housing is rotationally positioned within the outer housing. The outer housing may also include mounting points adapted to mount the outer housing to a vehicle.

Another embodiment of the disclosed novel upper strut mount includes an enclosing housing, a bearing housing slideably engaged to the enclosing housing; a spherical bearing race attached to the bearing housing; and a spherical bearing ball rotationally retained by the spherical bearing race. The upper strut mount may also include an elastomeric bushing positioned inside the enclosing housing and above the bearing housing. In one configuration, the spherical bushing is configured to receive a strut piston rod.

The upper strut mount may also include an upper and lower spacer adapted to fit within the spherical bushing.

The upper and lower spacers of the present embodiment may be sized to extend beyond the perimeter of the spherical bearing and are adapted to limit the movement of the spherical bearing relative to the enclosing housing.

The upper strut mount may also include a non-metallic wear ring positioned between the enclosing housing and the bearing housing. The bearing housing may also include a groove that is sized to receive the non-metallic wear ring.

The upper strut mount may also include an outer housing wherein the enclosing housing is rotationally positioned within the outer housing.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2 shows the internal structure of the upper strut mount.

FIG. 2 shows the internal structure of the upper strut mount.

DETAILED DESCRIPTION OF THE INVENTION

Upon review of the detailed description and the accompanying drawings provided herein, it will be apparent to one of ordinary skill in the art that an upper strut mount made according to the present invention may be used in a wide variety of applications. Accordingly, the present invention shall not be limited to the structures specifically described and illustrated herein, although the following description is particularly directed to an upper strut mount used in an automobile.

Figure 1:
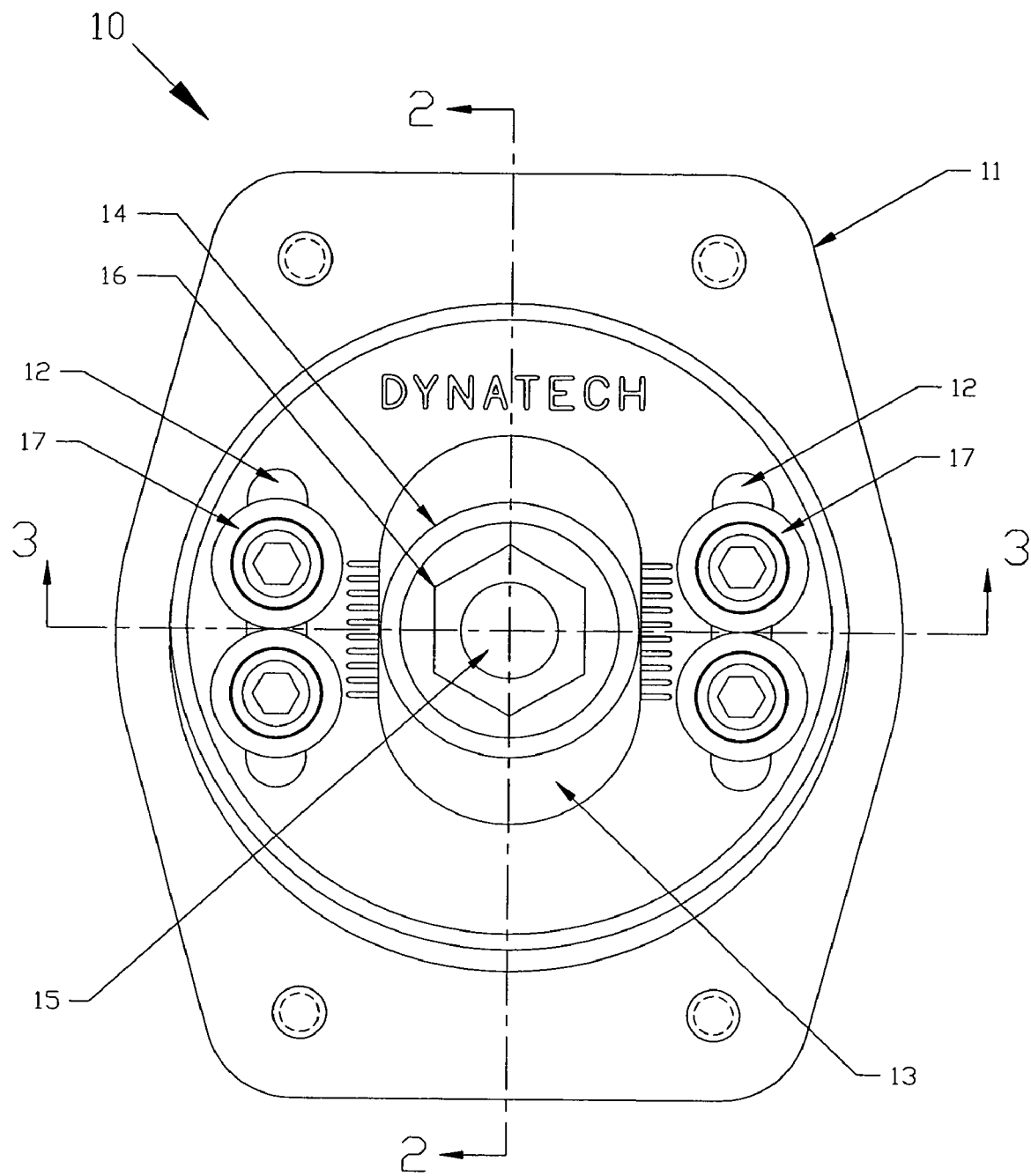
FIG. 1 is a top view of an upper strut mount.

FIG. 1 shows the top of the upper strut mount (10). The outer housing (11) is configured with tire camber angle adjustment slots (12) and a strut slot (13). The top of the enclosing housing (14), strut piston rod (15), and nut (16) for securing the piston rod in the upper strut mount (10) can been seen through the strut slot (13). The enclosing housing (14) is positioned relative to the outer housing (11). The upper strut mount (10) can be adjusted to change the camber angle by changing the position of the enclosing housing (14) relative to the outer housing (11). Capscrews and washers (17) are used to hold a desired position of the enclosing housing (14) relative to the outer housing (11). The strut slot (13) provides access to nut (16) and allows for visual inspection of the position of the enclosing housing (14) relative to the outer housing (11). The outer housing (11) is mounted to the vehicle chassis. (not shown).

Figure 2:
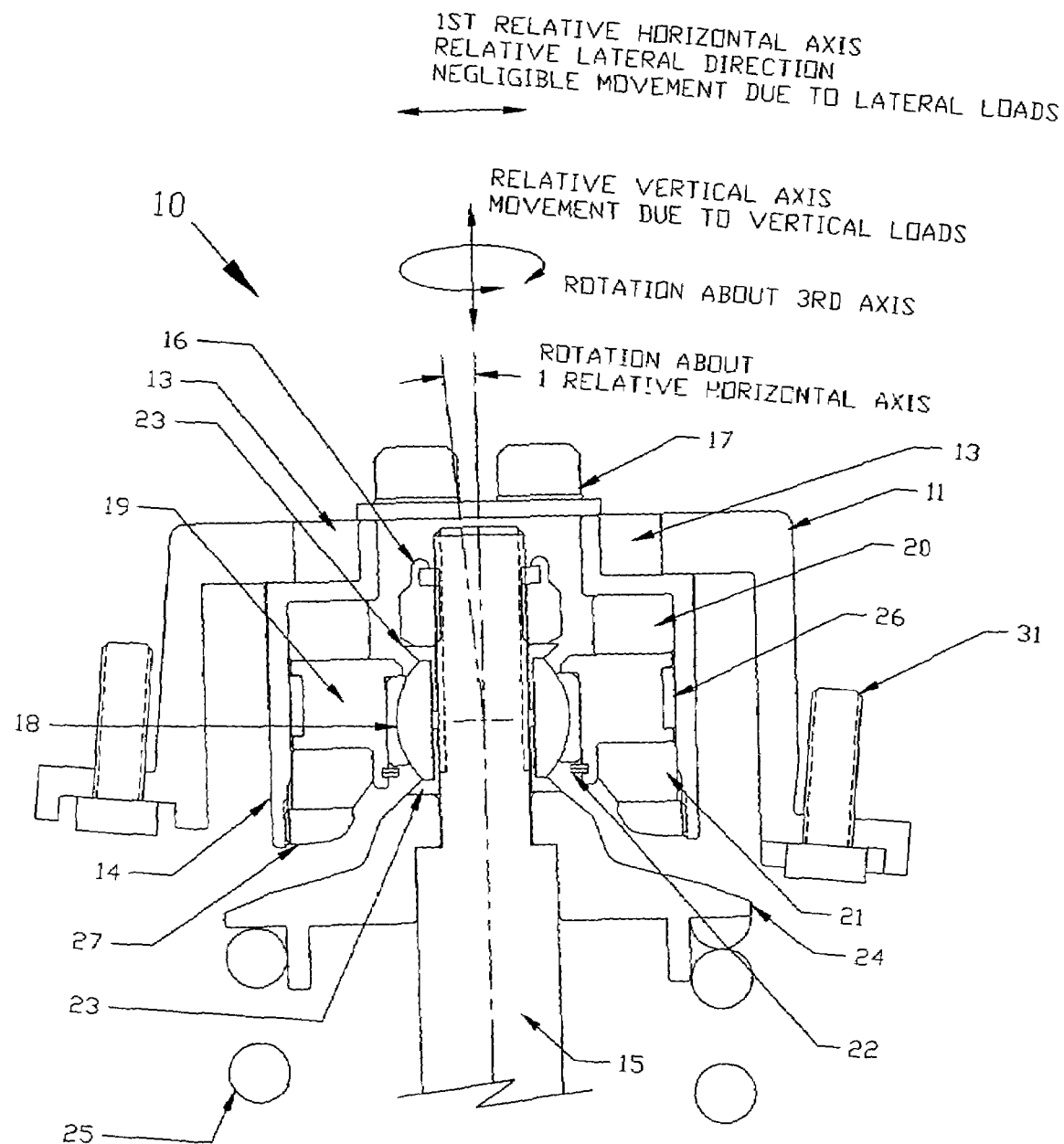
FIG. 2 is a cut-away of the upper strut mount shown in FIG. 1.
Figure 3:
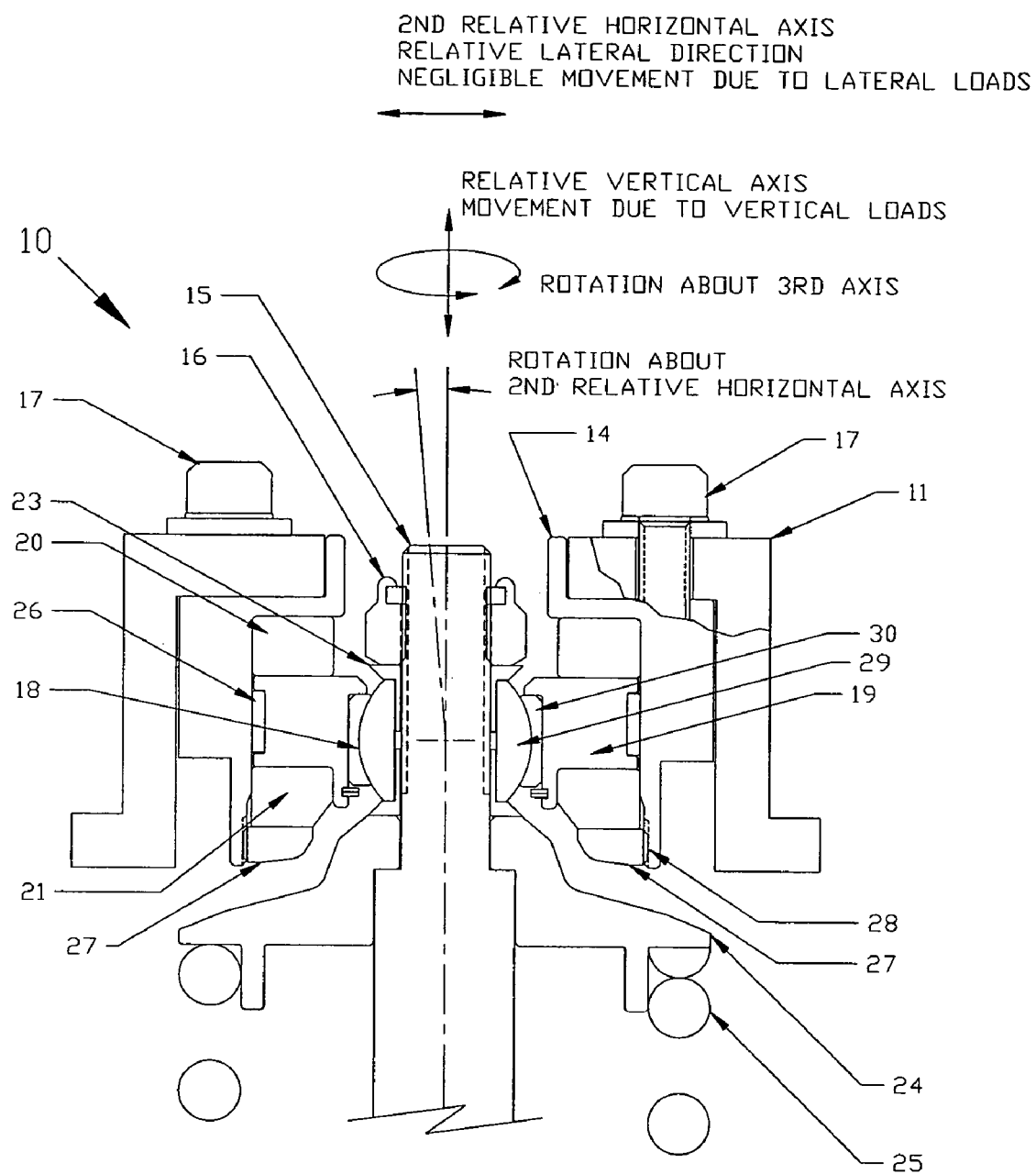
FIG. 3 is another cut-away of the upper strut mount shown in FIG. 1.

FIGS. 2 and 3 show side views of the upper strut mount (10). The enclosing housing (14) is shown centered relative to the outer housing (11). The upper strut mount (10) utilizes a spherical bearing (18) through which the strut piston rod (15) is attached and retained with a nut (16). The upper portion of the strut piston rod is threaded to receive nut (16). The spherical bearing (18) may be ptfe-lined or contain a plastic race to provide wear resistance and eliminate the need for lubrication. A benefit from the use of a spherical bearing (18) within the upper strut mount is that the spherical bearing allows rotation about all three axes, which are shown on FIGS. 2 and 3.

The spherical bearing (18) is mounted into the bore of a bearing housing (19). The spherical bearing (18) includes a spherical bearing ball (29) and race (30). The race (30) is positioned within a race groove (31) in the bearing housing (19). The bearing housing (19) is suspended between two ring-shaped elastomeric bushings (20 and 21). The spherical bearing (18) is retained within the bearing housing (19) with a retaining ring (22). A slight interference fit, or shaft-retaining adhesives, may also be used to ensure that the spherical bearing (18) does not move vertically relative to the bearing housing (19). Spacers (23) may be used above and below the spherical bearing (18) as it attaches to the strut piston rod (15). The spacers are sized to allow maximum angle of rotation of the spherical bearing (18). An upper and lower spacer is shown in FIGS. 2 and 3. It is understood that different spacer configurations may be used. For example, a singular spacer may be used or multiple spacers may be used. An upper spring mount (24), or spring seat, transfers loads from the coil spring (25) of the strut assembly through the spacer(s) (23) to the spherical bearing (18).

The bushings (20 and 21) may be made from rubber, synthetic rubber, polyurethanes, or similar elastomeric materials that provide compliance and damping properties. The bushings (20 and 21) may be the same size and material, they may be different sizes and made from different material, or combinations thereof, depending on the application. The bearing housing (19) also has a groove on the outside diameter in which a plastic wear ring (26) is mounted. The groove and plastic ring (26) are sized such that plastic wear ring is retained in the groove. In one embodiment, the plastic ring (26) is sized so that the bearing housing (19) does not contact the interior of the enclosing housing (14). Although one plastic wear ring is shown, multiple wear rings may be used. For example, bearing housing (19) can be configured with multiple grooves that support multiple wear rings. Additionally, the wear ring may be unitary as it is shown or it may be segmented and posited within separate recesses in the bearing housing. Since the spherical bearing (18) provides the required rotation about all three axes, the elastomeric bushings (20 and 21) need not provide any rotational capability. Thus the functionality of the bushings (20 and 21) can be simplified to provide vertical compliance only to dampen shock loads and vibration. The plastic wear ring (26) carries the lateral loads while ensuring negligible lateral deflection.

The bearing housing sub-assembly above is installed into the enclosing housing (14) with an enclosing flange (27). The enclosing flange (27) has an external thread that is sized to engage an internal thread (28) at the lower inside bore of the enclosing housing (14). In the present embodiment, the threaded ring is semi-permanently secured to the enclosing housing (14) with thread locking compounds, adhesives, or by deforming the thread slightly. Alternative embodiments include any other means of attaching a separate metal ring to act as an enclosing flange (27). Other alternative embodiments include an enclosing flange that is integrated with the enclosing housing, and created by deforming the extended cylindrical end of the housing to form a flat enclosing flange.

The dimensions and tolerances for the bearing housing groove, the enclosing housing bore, and the wear ring (26) are carefully selected to minimize the clearance between the wear ring (26) and the bore, ensuring minimal displacement of the bearing housing (19) before full contact occurs with the wear ring (26). The enclosing flange (27) of the enclosing housing is attached to create an interference condition with the two elastomeric bushings (20 and 21). This interference creates preload in the elastomeric bushings (20 and 21), ensuring that optimum damping of movement occurs when exposed to oscillating loads and vibrations from the strut.

In one embodiment of the design, the enclosing housing (14) is attached directly to the vehicle chassis. In an alternative embodiment of the design, the enclosing housing (14) mounts within an outer housing (11) which is, in turn, affixed rigidly to the chassis.

The present invention is, therefore, well adapted to carry out the objects and attain the ends and the advantages mentioned, as well as others inherent therein. While presently preferred embodiments have been described, numerous changes to the details of construction, arrangement of the upper strut mount's parts or components. Changes will readily suggest themselves to those skilled in the art and are encompassed within the spirit of invention and in the scope of the appended claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An upper strut mount assembly for operatively attaching a suspension strut assembly to a vehicle chassis comprising:
   an enclosing housing with an internal bore and a top flange;
   a bearing housing slideably positioned within said enclosing housing, wherein said bearing housing has an internal bore and a grooved outer surface;
   an upper elastomeric bushing positioned within said enclosing housing and between the top flange of said enclosing housing and said bearing housing;
   a non-metallic wear ring mounted in the groove in the outside of said bearing housing;
   a lower elastomeric bushing positioned within said enclosing housing and below said bearing housing;
   an enclosing flange attached to said enclosing housing and adapted to contain said lower bushing within said enclosing housing; and
   a spherical bearing assembly positioned in a fixed location within said the internal bore of said bearing housing.

2. The upper strut mount of claim 1, wherein said spherical bearing assembly comprises a spherical ball, an outer race engaged to said spherical ball, and a non-metallic liner positioned therebetween, wherein said spherical ball is rotationally engaged to said outer race and said spherical ball is adapted to receive a strut assembly piston rod.

3. The upper strut mount of claim 2, wherein said spherical ball may rotate about 3 axes with respect to said outer race.

4. The upper strut mount of claim 3, wherein said upper and lower elastomeric bushings are made from compressible materials selected from the group consisting of rubber, synthetic rubber, polyurethane, or combinations thereof.

5. The upper strut mount of claim 4, wherein said non-metallic wear ring is a substantially incompressible plastic or composite material.

6. The upper strut mount of claim 5, wherein said bearing housing is sized relative to said non-metallic wear ring to ensure that said bearing housing does not contact said enclosing housing.

7. The upper strut mount of claim 6, wherein said spherical bearing further comprises a spacer adapted to limit rotation of said spherical bearing relative to said bearing housing.

8. The upper strut mount of claim 7, wherein said bearing housing is adapted to transmit substantially all lateral loads through the non-metallic wear ring to the bore of the enclosing housing.

9. The upper strut mount of claim 8, wherein the non-metallic wear ring prevents lateral deflection of said bearing housing.

10. The upper strut mount of claim 9, wherein said bearing housing is adapted to transmit substantially all axial loads through said upper elastomeric bushing to the top flange of said enclosing housing or through the lower elastomeric bushing to said enclosing flange.

11. The upper strut mount of claim 10, wherein said upper and lower elastomeric bushings carry negligible lateral loads.

12. The upper strut mount of claim 11, wherein said enclosing housing is configured with attachment points for mounting to a vehicle chassis.

13. The upper strut mount of claim 11, wherein said upper strut mount further includes an outer housing, wherein said outer housing is positioned about said enclosing housing and is adjustable relative to said enclosing housing.

14. An upper strut mount assembly comprising, an enclosing housing with an internal bore and a top flange;
   an upper elastomeric bushing positioned within the internal bore of said bearing housing and compressibly engageable to the top flange of said enclosing housing;
   a bearing housing with a groove extending thereabout, positioned within the internal bore of said enclosing housing and below said upper elastomeric bushing, wherein said bearing housing is compressibly engageable to said upper bushing;
   a non-metallic wear ring mounted in the groove of said bearing housing;
   a lower elastomeric bushing positioned below said bearing housing and compressibly engageable to said bearing housing;
   an enclosing flange attached to said enclosing housing and positioned to retain said upper and lower elastomeric bushings within the internal bore of said bearing housing; and
   a spherical bearing assembly mounted at a fixed position within said bearing housing.

15. The upper strut mount of claim 14, wherein said spherical bearing assembly comprises a spherical ball, an outer race, and a non-metallic liner positioned between said spherical ball and said outer race.

16. The upper strut mount of claim 15, wherein said spherical bearing assembly is rotateable about 3 axes.

17. The upper strut mount of claim 16, wherein said non-metallic wear ring is a substantially incompressible plastic or composite material.

18. The upper strut mount of claim 17, wherein said bearing housing is sized relative to said non-metallic wear ring to ensure that said bearing housing does not contact the internal bore of said enclosing housing.

19. The upper strut mount of claim 18, wherein said upper and lower elastomeric bushings are made from compressible materials selected from the group consisting of rubber, synthetic rubber, polyurethane, or combinations thereof.

20. The upper strut mount of claim 19, wherein said spherical bearing further comprises a spacer adapted to limit rotation of said spherical bearing relative to said bearing housing.

21. The upper strut mount of claim 20, wherein said non-metallic wear ring carries substantially all the lateral loads transmitted by said bearing housing.

22. The upper strut mount of claim 21, wherein said bearing housing compressibly engages said upper or lower elastomeric bushing when sliding within the internal bore of said enclosing housing.

23. The upper strut mount of claim 22, wherein said enclosing housing is configured with attachment points for mounting to a vehicle chassis.

* * * * *